(No Model.)
J. E. RONK.
AQUATIC BICYCLE.
No. 520,899. Patented June 5, 1894.
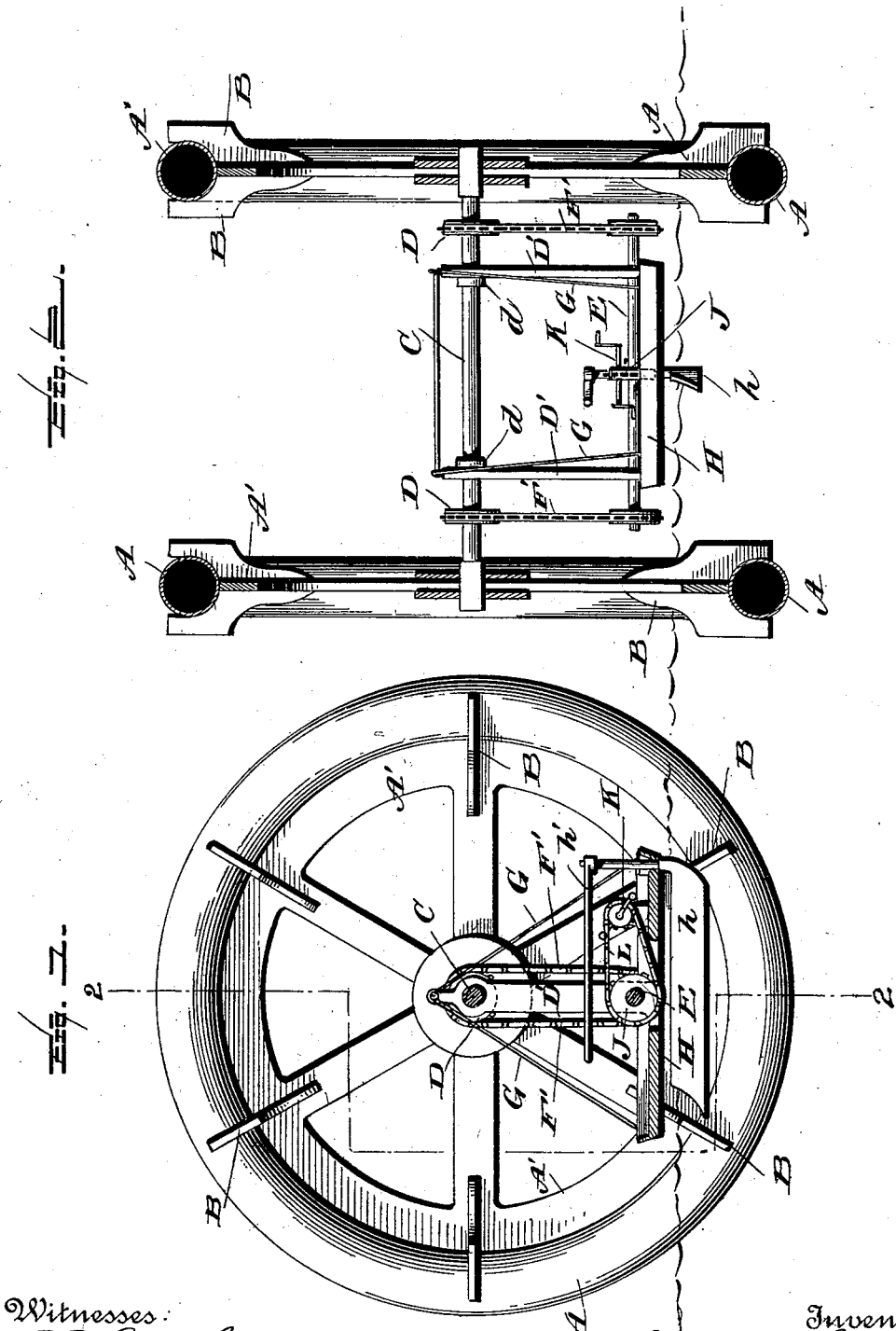

UNITED STATES PATENT OFFICE.

JACOB EARL RONK, OF FORT WINGATE, TERRITORY OF NEW MEXICO.

AQUATIC BICYCLE.

SPECIFICATION forming part of Letters Patent No. 520,899, dated June 5, 1894.

Application filed February 14, 1894. Serial No. 500,155. (No model.)

*To all whom it may concern:*

Be it known that I, JACOB EARL RONK, a citizen of the United States, residing at Fort Wingate, in the county of Bernalillo, New Mexico, have invented certain new and useful Improvements in Aquatic Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in aquatic bicycles in which pneumatic wheels affording great buoyancy are employed with paddles attached to the rim for propelling the craft through the water.

The invention consists further in suitable steering mechanism attached to a platform suspended from a shaft carrying the said pneumatic wheels, and from which shaft sprocket chains have connection with suitable gearing carried on the platform for propelling the craft.

My invention consists further in the novel construction, combination and adaptation of the parts as will be hereinafter more fully described, and then specifically defined in the appended claim.

I clearly illustrate my invention in the annexed drawings, which, with the letters of reference marked thereon form a part of this specification, and in which like letters of reference indicate like parts throughout both views, in which—

Figure 1, is a central sectional view of my aquatic bicycle. Fig. 2, is a section on the line 2, 2 of Fig. 1.

Reference now being had to the details of the drawings by letter, A, A, represent two pneumatic tires supported on the rims of the wheels A', A', and the said tires are preferably of about fifteen inches in diameter, so as to be of sufficient buoyancy to float the craft when loaded down with the necessary mechanism for propelling the carriage, and also with passengers. The wheels should be at least ten or fifteen feet in diameter, but would, of course vary, according to the load to be carried. The spokes of the wheels have laterally projecting paddles B, B, which serve as supports for the pneumatic tires as well as for use in propelling.

C is a shaft provided with sprocket wheels D, D, and on the said shaft are loosely journaled the suspending bars D' D', which are held from sliding lengthwise of the shaft by means of collars d, d, and which have journaled at their lower ends a shaft E, having sprocket wheels journaled thereon, and the sprocket chains F', F', connecting the sprocket wheels of both shafts.

G, G, are rods suspending from the upper ends of the bars D' D', the platform H, which carries the steering mechanism consisting of the rudder h, and helm h'.

J is a sprocket wheel keyed to the shaft E and having suitable connection with the crank K, through the medium of a sprocket chain L.

The size of my propeller will vary, according to the weight of the loads which it is desired to carry, and may be propelled either by hand or electric power.

In the construction of the tires, I prefer to have it made up of compartments, which can be easily inflated by means of a tube running through the center of the partitions. By this construction the pressure is more evenly distributed on the different portions of the said tire.

Having thus described my invention, what I claim to be new, and desire to secure by Letters Patent, is—

In combination with the pneumatic wheels with paddle extensions as described, the rods D' journaled near their upper ends to the main driving shaft, carrying at their lower ends a shaft having sprocket wheel and chain connection with the main shaft, and paddles for operating the same, the platform H suspended from the upper ends of the bars D' by the rods G, the said platform adapted to carry the steering mechanism, all substantially as shown and described.

In testimony whereof I affix my signature in presence of two witnesses.

JACOB EARL RONK.

Witnesses:
GERTIE HOLLIS,
TERENCE FOLEY.